March 22, 1949. J. E. LISBON 2,464,983
NUTCRACKER AUTOMATICALLY ADJUSTED
TO CRACK NUTS OF VARIOUS SIZES
Filed May 6, 1946
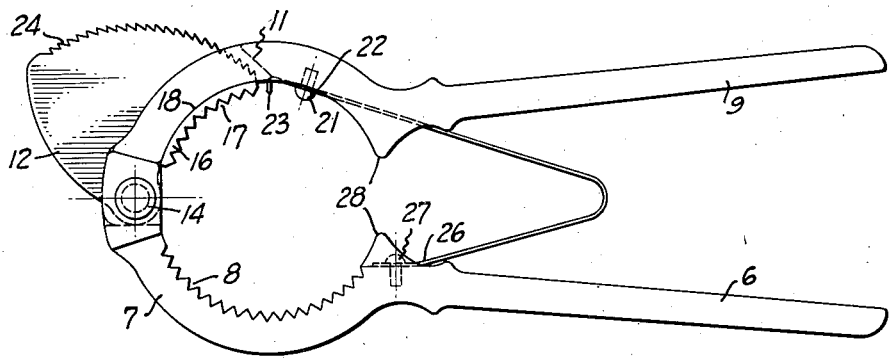
FIG_1_
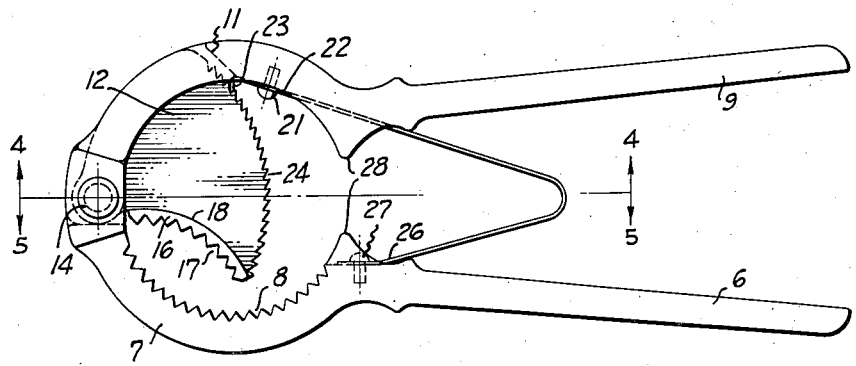
FIG_2_
FIG_3_
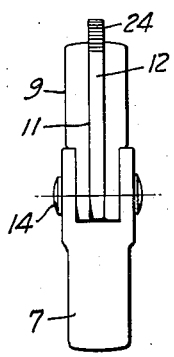
FIG_4_
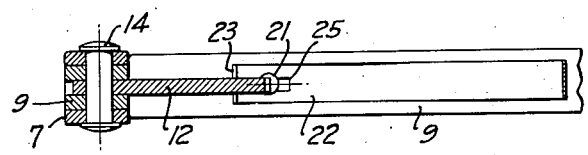
FIG_5_
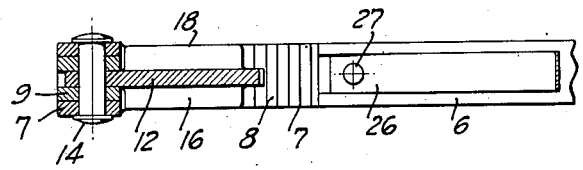
INVENTOR
J. E. Lisbon
BY
Robert N. Eckhoff
ATTORNEY Patented Mar. 22, 1949

2,464,983

UNITED STATES PATENT OFFICE 2,464,983

NUTCRACKER AUTOMATICALLY ADJUSTED TO CRACK NUTS OF VARIOUS SIZES

Julius E. Lisbon, Oakland, Calif.

Application May 6, 1946, Serial No. 667,667

3 Claims. (Cl. 146—16)

This invention relates to a nutcracker, and particularly to a nutcracker suited to the cracking of large, medium and small nuts, crab-legs, shell fish and the like.

As presently constructed, conventional nutcrackers are designed for the cracking of medium sized nuts so if one attempts to crack a large nut or a small nut, difficulty is encountered. With large nuts, the jaws of the cracking device must be spread apart such a distance that the device cannot be accommodated and gripped in one hand, while with small nuts, an insecure hold is frequently effected and the nut slips away from between the jaws.

A major object of the present invention is to provide a simple, novel and adjustable nutcracker which can be adjusted to accommodate for cracking a nut of any desired size.

The invention includes other objects and features of advantage, some of which, together with the foregoing, will appear hereinafter wherein the present preferred form of nut-cracker of this invention is disclosed.

In the drawings accompanying and forming a part hereof,

Figure 1 is a side elevation showing a nutcracker of the present invention adjusted to the cracking of the larger size of nuts.

Figure 2 is a side elevation, similar to Figure 1, but showing the nutcracker adjusted for cracking a nut of a very small size.

Figure 3 is an end elevation of the nutcracker shown in Figure 1.

Figures 4 and 5 are respectively sections taken along the line 4—4 and 5—5 of Figure 2 and showing details of the construction of the nutcracker.

Referring to the drawings, I provide a first handle 6 having an arcuate jaw portion 7 thereon including a plurality of serrations or teeth 8 to grip the surface of a nut. The arcuate jaw portion is preferably of such size and curvature as to accommodate a wide range in nuts. The device also includes a second handle 9 having a slot 11 therein in which a segment 12 is movable. The first handle 6, the second handle 9 and the segment 12 are hinged upon a common hinge support provided by a riveted pin 14, the three being movable about the pin as a common hinge support.

The movable segment 12 includes a jaw portion 16 thereon having a plurality of teeth or serrations 17 preferably formed of a size and curvature similar to that of jaw 7. On each side of the segment is an arcuately formed flange portion 18; as appears in Figure 1, the flange portion 18 rests against the arcuate portion of handle 9 in its position of maximum adjustment.

To provide for adjustment of the movable segment 12 throughout a plurality of positions of adjustment and its retention in any desired position, I provide a screw or pin 21 on the arcuate portion of handle 9. Slidably mounted upon pin 21, between pin 21 and handle 9, is a slidable member 22 having a slot 25 therein engaged with the pin. The member 22 includes a hooked portion 23 thereon adapted to be selectively engaged with any one of teeth 24 which are formed on the outer peripheral edge of the movable segment 12 about pin 14 as a center. Selective engagement of the slidable member 22 with any one of the teeth on the movable segment serves to lock the segment in a desired position of adjustment.

When it is desired to move the segment to diminish the space between the jaw portion 16 on the movable segment and jaw portion 7 on handle 6, it is only necessary to push inwardly upon the movable segment and slide teeth 24 over hooked portion 23. If this same action is repeated when a sliding force is exerted upon slidable member 22, the engagement between hooked portion 23 on the slidable member 22 and the tooth segmental portion 24 can be released and the segment retracted freely.

The slidable member 22 is preferably made in the form of a flat leaf spring bent in a V shape and having its other end 26 fastened by a pin 27 to handle 6 so that the closing movement of handles 6 and 9 is opposed by the spring. To limit the extent of closure of the handles and to prevent bruising of the fingers, projections 28 are provided upon each of the handles to limit the extent of movement of these.

It is not necessary to adjust the segment to fit a nut for, upon opening movement of handles 6 and 9, portion 23 is released from the teeth 24. If a nut is placed between jaws 7 and 17 and the handles moved together, the hooked portion 23 is engaged with teeth 24 upon the first portion of the movement. Continued movement of the handles then moves segment 12 toward jaw 7 so that the adjustment for any nut size is more or less automatic.

Upon reference to the drawing it will be observed that the length of the jaw on segment 12 is shorter than jaw 7 so that the leverage applied between jaws 7 and 17 is relatively great and comparatively constant. This ensures an adequate and substantially uniform force application to an object between the jaws.

From the foregoing, I believe it will be apparent that I have disclosed a new and novel form of nutcracker, one readily adjusted to the desired position so that a large nut, a medium sized nut, or a small nut can be selectively cracked as desired, the handles of the nutcracker being in any desired relative position irrespective of the nut size so that the hand size of the person manipulating the cracker is not important while a great force is smoothly and evenly applied and the nut is cracked and not shattered.

I claim:

1. A nutcracker comprising a first handle having a jaw on an inner surface thereof for cracking engagement with a nut, a second handle having a slot therein opposite the jaw on the first handle, a movable jaw segment, a pin providing a common hinge support for the first and second handles and for the movable segment, said segment being selectively movable in said slot in said second handle and having a jaw thereon for cooperation with said first mentioned jaw for cracking a nut positioned between the jaws, said movable segment having a toothed surface extending arcuately about said pin as a center, and a flat spring member carried by said first handle and said second handle normally urging said handles apart and movable on said second handle to engage and retain said movable segment in a desired position of adjustment with respect to said handle.

2. A nutcracker comprising a first handle having a jaw on an inner surface thereof for cracking engagement with a nut, a second handle having a slot therein opposite the jaw on the first handle, a movable jaw segment, a pin providing a common hinge support for the first and second handles and for the movable segment, said segment being selectively movable in said slot in said second handle and having a jaw thereon for cooperation with said first mentioned jaw for cracking a nut positioned between the jaws, said movable segment having a toothed surface extending arcuately about said pin as a center, and a segment tooth surface engaging member carried by said second handle and movable to engage and lock said segment in a nut-cracking position upon closing movement of said handles and to release said segment upon opening of said handles.

3. A nutcracker comprising a first handle having a jaw on an inner surface thereof for cracking engagement with a nut, a second handle, a movable jaw segment, a pin providing a common hinge support for the first and second handles and for the movable segment, said segment being selectively movable on said second handle and having a jaw thereon for cooperation with said first mentioned jaw for cracking a nut positioned between the jaws, said movable segment having a toothed surface extending arcuately about said pin as a center, and a segment tooth surface engaging member carried by said second handle and movable to engage and lock said segment in a nut-cracking position upon closing movement of said handles and to release said segment upon opening movement of said handles.

JULIUS E. LISBON.

REFERENCES CITED

The following references are of record in the file of this patent:

UNITED STATES PATENTS

| Number | Name | Date |
| --- | --- | --- |
| 1,436,571 | Bokor | Nov. 21, 1922 |
| 1,890,908 | Layton | Dec. 13, 1932 |